Jan. 21, 1958 R. B. KOCH 2,820,252
METHOD OF EXTRUSION
Filed Oct. 18, 1954
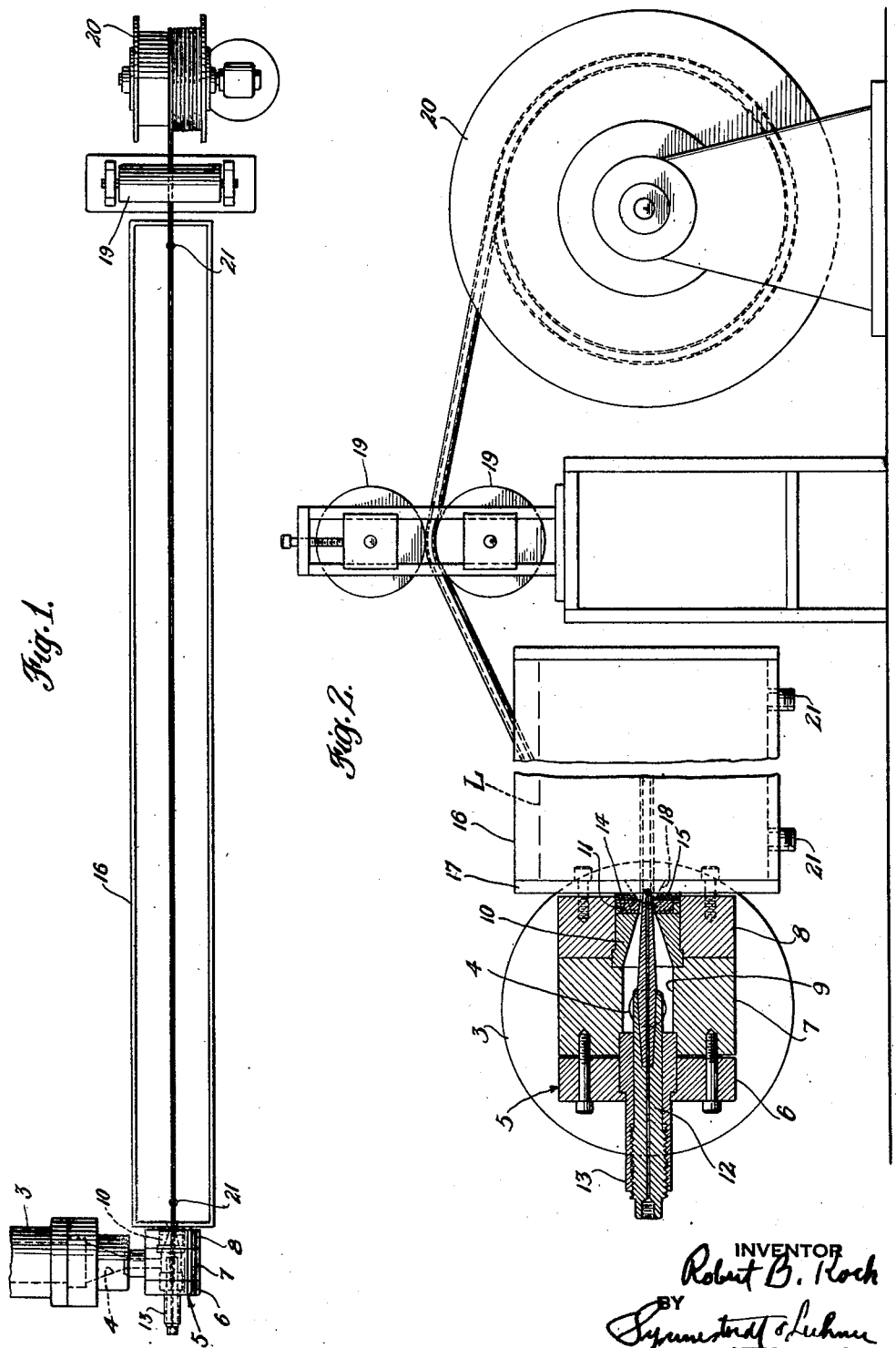
INVENTOR
Robert B. Koch
BY
Synnestvedt & Lechner
ATTORNEYS United States Patent Office 2,820,252
Patented Jan. 21, 1958

2,820,252

METHOD OF EXTRUSION

Robert B. Koch, Hyde Park, Pa., assignor to The Polymer Corporation, Reading, Pa., a corporation of Pennsylvania Application October 18, 1954, Serial No. 462,647

7 Claims. (Cl. 18—55)

This invention relates to extrusion of thermo-plastic materials to form elongated shapes, the invention being concerned with an extrusion method and a die structure especially adapted to the continuous extrusion of elongated shapes from synthetic linear polyamides, more particularly the so-called high melting polyamides, such as polyhexamethylene adipamide, polyhexamethylene sebacamide and polyepsilon aminocaproic acid.

Among the principal objects of the invention are the improvement of dimensional accuracy and surface-smoothness of the shapes extruded, while at the same time minimizing wear of the extrusion die.

How the foregoing general objects are attained is set forth more fully hereinafter following a description of a preferred embodiment of the die structure and of extrusion equipment arranged to provide for the practice of the method of the invention, all of which features are illustrated in the accompanying drawings, in which—

Figure 1 is a plan view of equipment arranged to provide for the extrusion of tubing according to the invention; and Figure 2 is an enlarged side elevational view of the equipment of Figure 1, with certain portions broken out and others shown in vertical section for simplicity and clarity of illustration.

The barrel of an extruder or screw feed device is illustrated in outline at 3. This device may be of known construction, in which a screw feed device operates in the barrel, the polyamide material being fed to the device and advanced by the screw for extrusion. During advance of the material through the barrel heat is applied thereto so as to melt the polyamide, and the melted, i. e., liquid polyamide is delivered from the barrel through a passage 4 into the die structure generally indicated at 5.

The die structure comprises an assembly of parts 6, 7 and 8 having a central chamber 9 therein with which the passage 4 communicates so as to receive the liquid polyamide from the extruder. Toward the delivery end of the die structure a nozzle part 10 is arranged having a cavity therein in the form of a tapering continuation of the cavity 9 and adjacent the delivery face of the die structure the extrusion die itself is positioned, as clearly appears at 11 in Figure 2. This die 11 may also have a somewhat tapered passage therethrough which constitutes the extrusion passage itself. Centrally arranged within the die structure is an adjustable pin 12 having threaded connection with the surrounding sleeve 13, by means of which the pin may be advanced or retracted with reference to the die opening. The pin 12 has a central passage formed therethrough to provide for the admission of air during the extrusion of the tubing from the die passage. A retainer piece 14 of washer-like form is positioned at the exit face of the die 11 and is centrally cut away or beveled as indicated at 15 in the region where the extruded tubing leaves the die 11. Therefore, the extrusion of the formed tubing occurs from the aperture in the die 11, without contact with the washer 14.

As clearly appears in the drawings, the extrusion die structure is arranged immediately at one end of an elongated vessel or trough 16 having side, bottom and end walls, but being upwardly open, and serving to contain the liquid of a bath into which the tubing is directly extruded from the die structure. For this purpose the adjacent end wall 17 of the trough is apertured as indicated at 18, this aperture being located below the level L of the bath, as appears from Figure 2. In this way the liquid of the bath has direct access to at least that portion of the surface of the extrusion die 11 immediately adjacent the extrusion aperture.

The extruded tubing is drawn lengthwise through and then out of the bath in the trough 16 by means of a pair of take-off rolls 19, from which the tubing passes to a take-up reel 20, on which it is wound. The take-off rolls are provided with drive mechanism (not shown) by which the speed of drawing of the tubing through the bath is determined, the drive for the reel 20 incorporating a slip means so that it merely serves to wind up the tubing fed to it from the take-off rolls.

The liquid of the bath may be circulated through a heat exchange device adapted to provide for temperature control, as by means of circulation connections 21—21 shown in Figure 2. With regard to the illustration of the bath and trough in Figure 2 it will be noted that the mid portion thereof is broken out, the circulation connections 21—21 preferably being located relatively close to the ends of the trough.

In the practice of the invention, two important features are preferably utilized. One of these relates to the composition of the material of which the extrusion die 11 is formed, and the other relates to the composition of the bath into which the tubing or other elongated shape is directly extruded from the die 11. These two features or factors mutually contribute to the two important objectives hereinabove referred to, i. e., the improvement of dimensional accuracy and surface smoothness of the extruded shape, while at the same time minimizing die wear.

The character of the die itself is here first considered. It is known that polytetrafluoroethylene has surface characteristics which are advantageous when this material is employed as an extrusion die. This material, however, tends to wear relatively rapidly and in addition tends to wear irregularly, thereby impairing the desired dimensions and surface smoothness of the shape being extruded.

According to the present invention the die is formed of polytetrafluoroethylene filled with fine silica particles. I have found that silica is strikingly distinguished from other theoretically usable fillers, in that the silica contributes a high degree of hardness and wear resistance without requiring excessively high loading, so that the hardness and wear resistance are provided without destroying the desirable surface characteristic contributed by the polytetrafluoroethylene. In preparation of the die, from about 5% to about 65% of silica may be used, preferably in the range from about 15% to 40 or 50% where the die is to be employed in the extrusion of the high melting polyamides.

The silica employed is preferably of the highly porous type and of fine particle size, say from .5 to 60 microns, a preferred particle size averaging in the range from 1 to 20 microns. In typical porous silica, the pore size is of the order of 20 to 100 Angstrom units.

The following description illustrates the preparation of a typical die piece of about 100 grams weight.

140 g. of 50% polytetrafluoroethylene aqueous suspensoid (containing some wetting or dispersing agent and ammonia) are used, and to this 420 g. of water are added, with stirring. 30 g. of silica of particle size averaging from 3 to 7 microns are also added with stirring, after which glass mill balls are introduced and the mixture is tumbled until a dough-like mass precipitates (about 6 to 24 hours).

The precipitated dough-like mass is then dried in an oven at a temperature between about 550° F. and 620° F., so as to drive off wetting agent and also water remaining. The resultant dried mass is then broken up, forming feathery pieces and this material is packed in a forming die and subjected to heating at from 627 to 750° F., under a pressure of 5,000 to 11,000 p. s. i. The forming die preferably conforms with the shape of the piece to be made, and to complete the die the central die aperture is cut therein, for instance of the shape illustrated in the drawings.

The foregoing procedure provides a die piece containing about 30% of silica by weight and having exceptional hardness and wear resistance. A die piece formed according to the invention is also characterized by unusually low loss of hardness upon elevation in temperature, even up to a temperature of the order of 575° F. The hardness and low loss are illustrated in comparison with unfilled polytetrafluoroethylene in the following table giving Shore durometer hardness readings on the D-scale.

|  | Room Temp. | 550° F. |
| --- | --- | --- |
| Unfilled Polytetrafluoroethylene | 55 | 23 |
| Polytetrafluoroethylene containing 30% Silica | 75 | 65 |

The extrusion die of the invention retains at least some of the desirable surface characteristics of the polytetrafluoroethylene and further has a thermal conductivity comparable to that of the unfilled polytetrafluoroethylene.

The die of the invention is also characterized by a much lower coefficient of thermal expansion than a die formed of unfilled polytetrafluoroethylene. Indeed, with about 50% silica the coefficient even approaches that of steel.

The wear resistance in actual use as a die is also outstanding. In the first place, irregularities in wear are substantially eliminated with the silica filled die, as compared with an unfilled polytetrafluoroethylene die. The rate of wear is enormously reduced usually by a factor of the order of 30 or 40. As an example, in the extrusion of tubing of ¼" outside diameter from polyhexamethylene adipamide, after a 4-hour run with a die formed of unfilled polytetrafluoroethylene the wear at different points in the die varied from .020 to .030"; whereas with the die formed of 30% silica filled polytetrafluoroethylene, the wear for a 12-hour run was about .002".

The foregoing comparative results are based upon actual operations in which the tubing was directly extruded into a water bath. As will be pointed out more fully hereinafter, when employing the silica-filled die together with a bath of the composition contemplated by the present invention, the wear on the silica-filled die is even further reduced.

Before considering the composition of the bath, it may first be mentioned that in the extrusion of tubing from a high melting polyamide, the liquid polyamide enters the central cavity of the die structure under the pressure exerted by the screw working in the barrel 3. The liquid condition of the polyamide is maintained during its passage through the die structure, for which purpose heater elements (not shown) are associated with the main body of the die structure. The temperature of heating will, of course, depend upon the particular material being extruded, and in the case of the high melting polyamides will be above the solidification point thereof, for instance in the range from about 10° F. to 75° F. above the solidification point. As the material is about to leave the die 11, i. e., in the close vicinity of the exit face of the die, the cooling action of the bath initiates solidification, and for this purpose the temperature of the bath is advantageously kept below 90° F., most desirably below about 60° F.

To reduce excessive chilling of the die itself by contact with the bath, an insulating washer such as indicated at 14 may be used. In a typical case such an insulating washer may comprise a glass fibre laminate filled with polytetrafluoroethylene. However, it is of importance that the extrusion actually take place from the die 11 directly into the bath, for reasons which will further appear hereinafter in the following discussion of the composition of the bath, and because of this there should be some exposure of the die to the bath.

I have found that the introduction of a wetting agent into the water of the setting bath definitely improves the extrusion operation, and still further that the introduction of a material having both wetting and lubricating characteristics effects additional improvement as compared with a material having wetting action only.

In the first place, the presence of an agent having a wetting action improves the heat transfer between the surface of the solidifying shape and the setting bath. Boiling and bumping of the bath on the surface of the extruded shape is virtually eliminated and this improves the surface smoothness and dimensional accuracy of the extruded shape.

Where the material added to the bath has both wetting and lubricating characteristics a still further striking improvement in operation is effected. This relates to the wear occurring in the extrusion passage of the die itself. Where the material added to the bath has both of the characteristics mentioned the wear is extensively reduced beyond the reduction obtained merely by the employment of the silica as filler in the polytetrafluoroethylene die.

While all the reasons for this may not be completely understood, the extrusion of the piece from the die directly into the bath containing the wetting and lubricating agent, and the contact of the die with the wetting and lubricating agent favorably influences the smoothness with which the actual extrusion occurs. It is believed that some of the agent is actually absorbed into the exit face of the die.

In a test run of the kind referred to above where ¼" O. D. polyhexamethylene adipamide tubing was being extruded, when the setting bath contained condensation product, as a wetting agent Triton X-100, an alkyl phenolethylene oxide alcohol marketed by Rohm & Haas, the wear on a 30% silica-filled die after a 12-hour run was not even measurable.

With respect to the lubricating action within the die, it is pointed out that where the die contains upwards of about 30% silica, irregular or pulsating extrusion will occur (as a result of sticking of the polyamide in the die) if such die is employed for extrusion into water alone. However, I have found that even with silica loadings well above 30%, for instance up to 50 or 60%, this tendency for the polyamide to stick in the die can be completely overcome by introduction of appropriate materials into the setting bath. Thus, even at very high silica loadings, the introduction of an agent (or a composite of agents) having both wetting and lubricating characteristics, entirely smooth operation can be achieved.

It is also pointed out that regardless of the percentage loading of silica, the presence of an agent in the setting bath having both lubricating and wetting characteristics achieves a surface smoothness of striking, almost mirror-like, finish.

A variety of different agents having either wetting action alone or having both wetting and lubricating properties may be used in the practice of the invention. The commercially known wetting agents generally may be employed for the purpose of providing the desired wetting action. For wetting purposes it is preferred to employ either an anionic or a nonionic wetting agent. To achieve maximum improvement in the extrusion operation it is preferred to select an agent having not only wetting characteristics but also lubricating properties.

Specific agents usable for various of the purposes referred to are:

"Aerosol OT"—a sodium dioctyl sulfosuccinate made by American Cyanimid Co.

"Tergitol 7"—a sodium heptadecyl sulfonate and dichloro ethyl ether, made by Carbide and Carbon Chemical Co.

"Vel"—A sulfonated monoglyceride of coconut oil fatty acids, made by Colgate Palmolive Peet Co.

"All"—An alkyl aryl sulfonate, made by Detergents, Inc.

"Alli"—a mixture of alkyl aryl polyether alcohol and a sodium salt of a sulfonated petroleum hydrocarbon, made by Lincoln Chemical Company.

"Ultrawet 35 KX"—a sodium salt of sulfonated petroleum hydrocarbon ($C_{16}$) made by Atlantic Refining Co.

"Cerfak N-25"—an alkolyl amine made by E. F. Houghton Co.

"Triton NE"—an alkyl phenol-ethylene oxide condensation product, made by Rohm & Haas.

Alkyl aryl polyether alcohols.

Of those mentioned above "Ultrawet 35 KX," "Triton NE" and the alkyl aryl polyether alcohols have not only wetting properties but also excellent lubricating properties. All of the others in the above list except for "Aerosol OT" and "Tergitol 7" have some lubricating effect, but not equal to that of the three just mentioned.

In selection of the agent to be employed several factors should be kept in mind. First, the agent should preferably have a relatively high boiling and/or decomposition point, so that, upon absorption into the extrusion die, it will remain in the desired physical and chemical state. With this in mind, the agent used should preferably have both boiling and decomposition points above 400° F., and preferably above 500° F. The agent selected should also be substantially inert with reference to the polyamides, even at temperatures corresponding to the melting point thereof. This is important in order to avoid any chemical or solvent action on the shape being extruded. The agent selected must also be water soluble, so that it can be incorporated into the setting bath.

The preferred concentration of the wetting or wetting and lubricating agent used in the setting bath will vary according to the particular agent selected. In general, even fractional percentages of such agents will effect at least some improvement. Indeed, in the case of certain agents, percentages running down as far as .01 or .02% have been found to produce a noticeable improvement in the extrusion operation. Ordinarily, not more than about 3% is needed to produce an extensive effect, although additional quantities may be present with at least some of the agents. Preferably the agent is not present in quantities exceeding about 5 to 10%, particularly with certain individual agents, the effect of which has been found to diminish in concentrations upwards of about 5%. The presence of an excessively large quantity of various of the wetting agents has a tendency to reduce rather than increase the efficiency of heat transfer, and this tends to cause irregular or pulsating extrusion, and is therefore to be avoided.

As indicated above, because of the specific characteristics thereof, certain of the wetting agents provide a wetting action only, without contributing any appreciable lubricating action. Agents in this class, for instance, Aerosol OT, will serve to improve heat transfer from the extruded shape to the setting bath, because of the wetting action thereof, but will not, per se, reduce die wear or prevent sticking of the extruding material in the die. However, I have found that wetting agents of this type may be employed in combination with some other agent contributing the desired lubrication. For example, Safco #770, a petroleum oil emulsified with sulfonated soaps made by Swan Finch Oil Company, may be used in combination with Aerosol OT, in which event die wear is reduced and sticking is avoided, even where the extrusion die contains quantities of silica well above 30%. The Safco oil itself will not effect any appreciable improvement with respect to die wear and/or sticking of the material in the die; and in view of this, it may be that the concurrent use of the wetting agent serves not only the purpose of improving heat transfer but also that further function of enabling absorption of some quantity of the oil into the extrusion die, and thereby provide the lubricating action required to avoid sticking and provide smooth extrusion, as well as reduction in die wear. An effective combination of these two agents is provided by inclusion of about .03% of Aerosol OT and .05% of the Safco oil.

I claim:

1. A method for forming elongated shapes from polyamides, which method comprises forcing molten polyamide through a die formed of polytetrafluoroethylene filled with silica directly into a water bath containing a wetting agent.

2. A method according to claim 1 in which the silica-filled polytetrafluoroethylene die comprises from 5% to 65% of silica.

3. A method according to claim 1 in which the water bath is maintained at a temperature below 90° F.

4. A method according to claim 1 in which the water bath contains from .01% to 3% of the wetting agent.

5. A method for forming elongated shapes from polyamides, which method comprises forcing molten polyamide through a die formed of polytetrafluoroethylene filled with silica directly into a water bath containing a water soluble oily liquid wetting agent.

6. A method for forming elongated shapes from polyamides, which method comprises forcing molten polyamide through a die formed of polytetrafluoroethylene with silica particles dispersed therein, the silica particles comprising from 30% to 65% of the material of the die, the elongated shape being delivered from the die directly in a water bath containing an agent having wetting and lubricating characteristics, said agent being absorbable by the material of the die.

7. A method for forming elongated shapes from polyamides, which method comprises forcing molten polyamide through a die formed of polytetrafluoroethylene with silica particles dispersed therein, the silica particles comprising from 30% to 65% of the material of the die, the elongated shape being delivered from the die directly in a water bath including at least one agent for imparting wetting and lubricating characteristics, at least said lubricating agent being absorbable by the material of the die.

References Cited in the file of this patent

UNITED STATES PATENTS

| | | |
|---|---|---|
| 2,324,397 | Hull | July 13, 1943 |
| 2,403,476 | Berry et al. | July 9, 1946 |